Patented Jan. 13, 1953

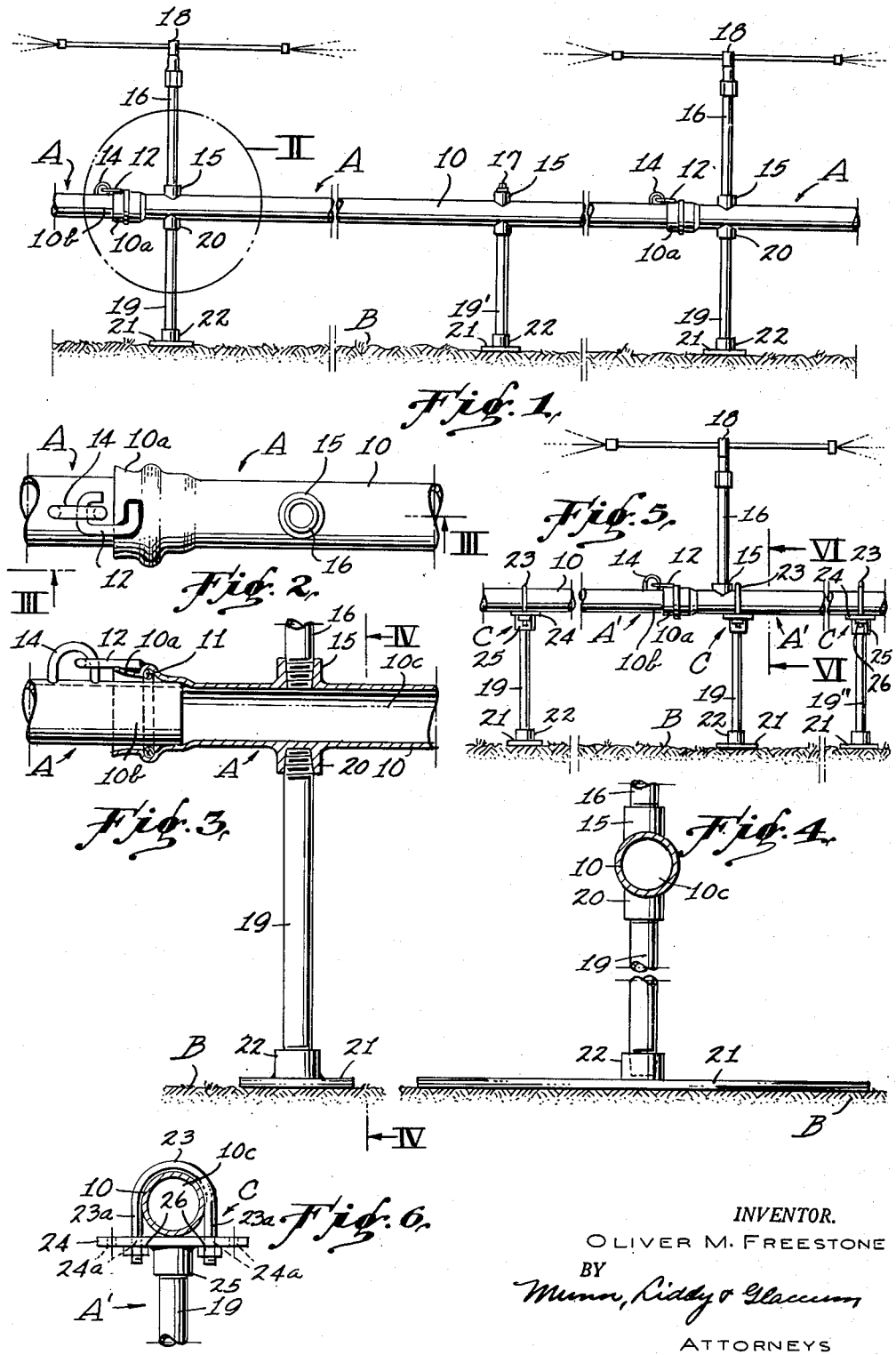

2,625,434

UNITED STATES PATENT OFFICE 2,625,434

PORTABLE OFF-THE-GROUND SPRINKLER APPARATUS

Oliver M. Freestone, Paradise, Calif.

Application January 22, 1951, Serial No. 207,175

4 Claims. (Cl. 299—104)

The present invention relates to improvements in a portable off-the-ground sprinkler apparatus. It consists of the combinations, constructions and arrangement of parts, as hereinafter described and claimed.

In portable sprinkler systems, it is customary to couple lengths of pipe together and lay them directly on the ground. When changing the system from one place to another, the pipe lengths must be uncoupled, moved to new positions, and then recoupled. During the uncoupling and recoupling steps, dirt and trash often enter the ends of the pipes, causing the sprinklers to become stopped.

The principal object of this invention is to support the pipe lengths above the ground at all times, thus precluding foreign matter from entering the pipes. More specifically, I provide standards having their upper ends anchored to the pipe lengths, while their lower ends have ground-engaging base plates secured thereto. These plates extend transversely relative to the lengths of pipes so as to provide a firm foundation for the pipes.

It is further proposed in this invention to provide units for a portable off-the-ground sprinkler apparatus, which are self-contained, and adapted to be moved readily from place to place as the irrigation of the ground proceeds. Each unit includes its own standards, base plates and sprinklers. When establishing the water-conveying line, it is merely necessary to couple the units in end-to-end relation, and the line will be supported at the desired distance above the ground.

Other objects and advantages will appear as the specification continues. The novel features will be pointed out in the claims hereunto appended.

Drawing

For a better understanding of my invention, reference should be had to the accompanying drawing, forming part of this application, in which:

Figure 1 is a fragmentary side elevational view of one form of my portable off-the-ground sprinkler apparatus;

Figure 2 is a top plan view of the portion of the apparatus included within the dot-dash line circle II of Figure 1;

Figure 3 is a vertical longitudinal sectional view taken along the plane III—III of Figure 2, parts being shown in elevation;

Figure 4 is a transverse sectional view taken along the vertical plane IV—IV of Figure 3;

Figure 5 is a fragmentary view similar to Figure 1, but disclosing U-shaped bolts and clamping bars for anchoring the standards to the pipe lengths; and Figure 6 is a transverse sectional view taken along the plane VI—VI of Figure 5.

While I have shown only the preferred forms of my invention, it should be understood that various changes, or modifications, may be made within the scope of the annexed claims without departing from the spirit thereof.

Detailed description

Referring to the first embodiment of my invention, as shown in Figures 1 to 4, inclusive, I provide a plurality of irrigation units designated generally at A. These units are identical with one another, and each includes a rigid water-conveying pipe 10 made of light-weight steel, aluminum, or other suitable material.

It will be noted that each of the pipes 10 is fashioned with an outwardly-flaring bell 10a at one end thereof, which is adapted to have the opposite or plain end 10b of an adjacent length of pipe telescoped thereinto (see Figure 3). For the purpose of providing a fluid-tight joint, a gasket 11 is interposed between the telescoping ends of the pipe lengths. A hook 12 is welded, or otherwise secured, to the bell end of one pipe, and is engageable with an eye 14 anchored to the plain end of the next pipe.

Tubular bosses 15 are welded to the pipe lengths 10 at intervals along the upper surfaces of these pipes, and communicate with the bores 10c of the latter. Selected bosses 15 have water-delivery riser pipes 16 threaded thereinto, while the remaining bosses are closed by plugs 17. As shown in Figure 1, rotatable sprinkler heads 18 are mounted at the tops of these risers so as to discharge water over the ground B.

The water-conveying pipes 10 are supported at a desired distance above the ground by standards 19. The upper ends of these standards are threaded into bosses 20, which are welded or otherwise secured to the underneath sides of the pipes 10. Good balance may be obtained by mounting the standards 19 directly below the riser pipes 16. Ground-engaging base plates 21 have bosses 22 secured thereto, which are threaded onto the lower ends of the standards. One of the standards in each unit is arranged adjacent to the bell end of its pipe.

As illustrated in Figure 4, the base plates 21 extend transversely relative to the length of the pipes 10, and are sufficiently long to prevent these pipes from overturning. It is quite apparent that when the pipes 10 are moved from place to place, the plates 21 can be drawn over the ground. Upon bringing these water-conveying pipes to rest, the standards 19 will support the pipes 10 at a convenient height to facilitate coupling the pipe lengths together. It will be found convenient to arrange the intermediate standard 19' (see Figure 1) approximately three-fifths of the way between the bell 10a and the plain end 10b of each unit. This will provide ample support for the end 10b of the pipe.

Turning now to the modification shown in Figures 5 and 6, it will be observed that the irrigation units A' are identical with the units previously described, excepting for clamps C that secure the pipes 10 to the standards 19. Like reference numerals have been applied to corresponding parts of the two embodiments.

The clamps C include U-shaped bolts 23, which fit over the pipes 10, with their legs 23a projecting downwardly through selected openings 24a provided in clamp bars 24. These bars rest against the underneath surfaces of the water-conveying pipes 10, and have bosses 25 thereon that are threaded onto the upper ends of the standards 19. The openings 24a are disposed at varying distances from the pipes 10 so that pipes of various diameters can be supported and clamped to the bars.

The U-shaped bolts 23 that are snugly disposed adjacent to the ends of the pipes 10 in Figure 5 are drawn tightly into engagement with these pipes by nuts 26. The intermediate standards 19'' in this view are applied to the pipes 10 so that they will swing free on the pipes. In this case the nuts 26 are tightened sufficiently to keep the clamps in place. However, the standards 19'' and their base plates 21 of these intermediate standards can move to compensate for uneven ground surface. It will be noted from Figure 6 that the holes 24a in the bars 24 will allow pipes of various diameters to be supported on these bars, and that the U-shaped bolts employed can fit the particular pipe being used.

In both forms of the invention, the water-conveying pipes 10, standards 19 and the base plates 21 may be made of any suitable lengths and sizes, depending upon the requirements.

*Summary of operation*

The assembly and operation of my portable off-the-ground sprinkler apparatus is summarized briefly as follows:

In assembling a sprinkler irrigating line, the units are brought into approximate alignment with one another so as to extend in the desired direction, with the standards 19—19' supporting the pipes 10 above the ground B. The plain ends 10b of each water-conveying pipe is telescoped into the bell-shaped end 10a of the adjacent unit, and the hooks 12 are engaged with the eyes 14. Of course, the riser pipes 16 extend vertically. Water flowing through the pipes 10 will be discharged by the rotatable sprinkler heads 18 over the ground to be irrigated.

The same procedure is followed when establishing a line of the units A' shown in Figures 5 and 6. In this event, however, the intermediate standards 19'' can move relative to the pipes 10 until the base plates 21 thereof come to rest on the ground, even though the surface of the latter may not be level.

When changing the line from one place to another, it is merely necessary to disengage the hooks 12 from the eyes 14, and then slide the units A or A' into their new locations. Thereupon, the units are coupled together again in the manner previously described. In either case, the coupling and uncoupling can be accomplished without allowing dirt or trash to gain access to the bores 10c of the pipe lengths. Thus the sprinkler heads will not become clogged with foreign matter. It is apparent that other types of sprinkler heads may be employed.

The water-conveying pipes 10, and the particular manner of interconnecting them by the telescoping ends 10a—10b, gasket 11, hooks 12 and eyes 14 all are old in the art. They have been shown by way of illustration only. The particular combinations and constructions that I desire to secure by Letters Patent are defined in the annexed claims.

I claim:

1. In a portable off-the-ground sprinkler apparatus, an irrigation unit including: a rigid water-conveying pipe; a plurality of substantially upright standards disposed beneath this pipe; each standard having a bar at its upper end on which the pipe is supported; each bar being provided with a series of openings therein spaced at varying distances from the pipe; U-shaped bolts fitting snugly over the particular size of pipe mounted on the bars in straddling relation with the pipe; these bolts having legs extending downwardly through selected openings in the bar; and clamping nuts threaded on the legs of the bolts and disposed beneath the bars.

2. In a portable off-the-ground sprinkler apparatus, an irrigation unit including: a rigid water-conveying pipe adapted to be placed over ground to be irrigated, and spaced thereabove; threaded bosses secured to this pipe at intervals along its underneath surface so as to depend therefrom; vertically-arranged pipe standards screwed into these bosses for supporting the water-conveying pipe at a desired distance above the ground; and elongated, flat, ground-engaging base plates having threaded bosses on their upper faces, which are screwed onto the lower ends of the pipe standards; these plates being disposed transversely underneath the water-conveying pipe, and projecting laterally to such an extent on opposite sides of this pipe as to prevent the latter from overturning.

3. In a portable off-the-ground sprinkler apparatus, an irrigation unit including: a rigid water-conveying pipe adapted to be placed over ground to be irrigated, and spaced thereabove; non-perforated threaded bosses welded to this pipe at intervals along its underneath surface so as to depend therefrom; vertically-arranged pipe standards screwed into these bosses for supporting the water-conveying pipe at a desired distance above the ground; and elongated, flat, ground-engaging base plates having threaded bosses on their upper faces, which are screwed onto the lower ends of the pipe standards; these plates being disposed transversely underneath the water-conveying pipe, and projecting laterally to such an extent on opposite sides of this pipe as to prevent the latter from overturning.

4. In a portable off-the-ground sprinkler apparatus, an irrigation unit including: a rigid water-conveying pipe adapted to be placed over ground to be irrigated, and spaced thereabove; a plurality of transverse bars disposed beneath the water-conveying pipe in abutting relation therewith; these bars being arranged at intervals along the length of the water-conveying pipe; U-shaped bolts clamping these bars to the pipe;

each bar having a threaded boss secured to its underneath surface so as to depend therefrom; vertically-arranged pipe standards screwed into these bosses of the bars for supporting the water-conveying pipe at a desired distance above the ground; and elongated, flat, ground-engaging base plates having threaded bosses on their upper faces, which are screwed onto the lower ends of the pipe standards; these plates being disposed transversely underneath the water-conveying pipe, and projecting laterally to such an extent on opposite sides of this pipe as to prevent the latter from overturning.

OLIVER M. FREESTONE.

REFERENCES CITED

The following references are of record in the file of this patent:

UNITED STATES PATENTS

| Number | Name | Date |
|---|---|---|
| 1,068,872 | Eichhoff | July 29, 1913 |

FOREIGN PATENTS

| Number | Country | Date |
|---|---|---|
| 257,192 | Italy | Feb. 16, 1928 |
| 372,806 | Germany | Apr. 22, 1923 |